US009632801B2

(12) United States Patent
Pal et al.

(10) Patent No.: US 9,632,801 B2
(45) Date of Patent: Apr. 25, 2017

(54) BANKED MEMORY ACCESS EFFICIENCY BY A GRAPHICS PROCESSOR

(71) Applicant: Intel Corporation, Santa Clara, CA (US)

(72) Inventors: Supratim Pal, Bangalore (IN); Murali Sundaresan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/249,154

(22) Filed: Apr. 9, 2014

(65) Prior Publication Data

US 2015/0294435 A1 Oct. 15, 2015

(51) Int. Cl.
*G06T 1/60* (2006.01)
*G06F 9/445* (2006.01)
*G06F 12/08* (2016.01)
*G06F 12/084* (2016.01)

(52) U.S. Cl.
CPC ............. *G06F 9/445* (2013.01); *G06F 12/08* (2013.01); *G06F 12/084* (2013.01); *Y02B 60/1225* (2013.01)

(58) Field of Classification Search
None
See application file for complete search history.

(56) References Cited

U.S. PATENT DOCUMENTS

| | | | | |
|---|---|---|---|---|
| 5,379,393 A | * | 1/1995 | Yang | G06F 12/0875 711/3 |
| 6,446,105 B1 | * | 9/2002 | Washio | G06F 17/11 708/443 |
| 6,665,768 B1 | * | 12/2003 | Redford | G06F 12/0607 365/230.03 |
| 7,257,695 B2 | | 8/2007 | Jiang et al. | |
| 7,333,114 B2 | | 2/2008 | Andrews et al. | |
| 7,840,001 B2 | * | 11/2010 | Belnet | G06F 9/3836 380/37 |
| 8,072,463 B1 | * | 12/2011 | Van Dyke | G06F 12/0607 345/540 |
| 8,751,771 B2 | | 6/2014 | Fahs et al. | |

(Continued)

OTHER PUBLICATIONS

Intel, R. "Intel 64 and ia-32 architectures optimization reference manual.","http://www.intel.com/content/dam/doc/manual/64-ia-32-architectures-optimization-manual.pdf", Intel Corporation, May 2012.*

(Continued)

*Primary Examiner* — Xiao Wu
*Assistant Examiner* — Yu Chen
(74) *Attorney, Agent, or Firm* — Compass IP Law PC

(57) ABSTRACT

Conversion of an array of structures (AOS) to a structure of arrays (SOA) improves the efficiency of transfer from the AOS to the SOA. A similar technique can be used to convert efficiently from an SOA to an AOS. The controller performing the conversion computes a partition size as the highest common factor between the structure size of structures in AOS and the number of banks in a first memory device, and transfers data based on the partition size, rather than on the structure size. The controller can read a partition size number of elements from multiple different structures to ensure that full data transfer bandwidth is used for each transfer.

15 Claims, 10 Drawing Sheets

(56) References Cited

U.S. PATENT DOCUMENTS

| | | | |
|---|---|---|---|
| 2011/0185150 A1* | 7/2011 | Spracklen | G06F 9/30018 712/22 |
| 2012/0089792 A1* | 4/2012 | Fahs | G06F 9/30036 711/154 |
| 2013/0339649 A1* | 12/2013 | Hsu | G06F 3/14 711/170 |
| 2014/0164704 A1* | 6/2014 | Kuesel | G06F 12/0802 711/122 |
| 2014/0297921 A1* | 10/2014 | Chang | G06F 12/0246 711/103 |
| 2014/0331032 A1 | 11/2014 | Ahmed et al. | |
| 2015/0243259 A1 | 8/2015 | Hsu et al. | |

OTHER PUBLICATIONS

Kurian, Lizyamma, et al. "Module partitioning and interlaced data placement schemes to reduce conflicts in interleaved memories." Parallel Processing, 1994. vol. 1. ICPP 1994. International Conference on. vol. 1. IEEE, 1994.*

Nakano, Koji. "Simple memory machine models for GPUs." International Journal of Parallel, Emergent and Distributed Systems 29.1 (2014): 17-37.*

Bryan Catanzaro, et al, A Decomposition for In-place Matrix Transposition, PPoPP' 14, Proceeding of the 19th ACM SIGPLAN symposium on Principles and Practice of parallel programming, Feb. 15-19, 2014, Orlando, FL., 15 pages.

Felice Pantaleo, et al., Development of a parallel trigger framework for rare decay searches, Tesi di Laurea, Anno Accademico 2012-2013, 169 pages.

I-Jui Sung, et al., In-Place Transposition of Rectangular Matrices on Accelerators, PPoPP' 14, Proceeding of the 19th ACM SIGPLAN symposium on Principles and Practice of parallel programming, Feb. 15-19, 2014, Orlando, FL., 13 pages.

International Search Report and Written Opinion for PCT Patent Application No. PCT/US2015/025004, Mailed Jun. 24, 2015. 11pages.

Keisuke Iwai, et al., Acceleration of AES encryption on CUDA GPU, International Journal of Networking and Computing—www.ijnc.org, ISSN 2185-2839 (print) ISSN 2185-2847 (online), vol. 2, No. 1, pp. 131-145, Jan. 2012, 16 pages.

* cited by examiner

AOS CONTENT

STRUCT SIZE=6, PART SIZE=2, BANK SIZE=16

| 0.0 | 0.1 | 0.2 | 0.3 | 0.4 | 0.5 | 1.0 | 1.1 | 1.2 | 1.3 | 1.4 | 1.5 | 2.0 | 2.1 | 2.2 | 2.3 |
| 2.4 | 2.5 | 3.0 | 3.1 | 3.2 | 3.3 | 3.4 | 3.5 | 4.0 | 4.1 | 4.2 | 4.3 | 4.4 | 4.5 | 5.0 | 5.1 |
| 5.2 | 5.3 | 5.4 | 5.5 | 6.0 | 6.1 | 6.2 | 6.3 | 6.4 | 6.5 | 7.0 | 7.1 | 7.2 | 7.3 | 7.4 | 7.5 |
| 8.0 | 8.1 | 8.2 | 8.3 | 8.4 | 8.5 | 9.0 | 9.1 | 9.2 | 9.3 | 9.4 | 9.5 | A.0 | A.1 | A.2 | A.3 |
| A.4 | A.5 | B.0 | B.1 | B.2 | B.3 | B.4 | B.5 | C.0 | C.1 | C.2 | C.3 | C.4 | C.5 | D.0 | D.1 |
| D.2 | D.3 | D.4 | D.5 | E.0 | E.1 | E.2 | E.3 | E.4 | E.5 | F.0 | F.1 | F.2 | F.3 | F.4 | F.5 |

FIG. 3A

AOS CONTENT – OPERATION 0

| 0.0 | 0.1 | 0.2 | 0.3 | 0.4 | 0.5 | 1.0 | 1.1 | 1.2 | 1.3 | 1.4 | 1.5 | 2.0 | 2.1 | 2.2 | 2.3 |
| 2.4 | 2.5 | 3.0 | 3.1 | 3.2 | 3.3 | 3.4 | 3.5 | 4.0 | 4.1 | 4.2 | 4.3 | 4.4 | 4.5 | 5.0 | 5.1 |
| 5.2 | 5.3 | 5.4 | 5.5 | 6.0 | 6.1 | 6.2 | 6.3 | 6.4 | 6.5 | 7.0 | 7.1 | 7.2 | 7.3 | 7.4 | 7.5 |
| 8.0 | 8.1 | 8.2 | 8.3 | 8.4 | 8.5 | 9.0 | 9.1 | 9.2 | 9.3 | 9.4 | 9.5 | A.0 | A.1 | A.2 | A.3 |
| A.4 | A.5 | B.0 | B.1 | B.2 | B.3 | B.4 | B.5 | C.0 | C.1 | C.2 | C.3 | C.4 | C.5 | D.0 | D.1 |
| D.2 | D.3 | D.4 | D.5 | E.0 | E.1 | E.2 | E.3 | E.4 | E.5 | F.0 | F.1 | F.2 | F.3 | F.4 | F.5 |

TB CONTENT – OPERATION 0

| 0.0 | 1.0 | 2.0 | 3.0 | 4.0 | 5.0 | 6.0 | 7.0 | X | X | X | X | X | X | X | X |
| X | X | X | X | X | X | X | X | 0.1 | 1.1 | 2.1 | 3.1 | 4.1 | 5.1 | 6.1 | 7.1 |
| X | X | X | X | X | X | X | X | X | X | X | X | X | X | X | X |
| X | X | X | X | X | X | X | X | X | X | X | X | X | X | X | X |
| X | X | X | X | X | X | X | X | X | X | X | X | X | X | X | X |
| X | X | X | X | X | X | X | X | X | X | X | X | X | X | X | X |

FIG. 3B

AOS CONTENT – OPERATION 1

| 0.0 | 0.1 | 0.2 | 0.3 | 0.4 | 0.5 | 1.0 | 1.1 | 1.2 | 1.3 | 1.4 | 1.5 | 2.0 | 2.1 | 2.2 | 2.3 |
|---|---|---|---|---|---|---|---|---|---|---|---|---|---|---|---|
| 2.4 | 2.5 | 3.0 | 3.1 | 3.2 | 3.3 | 3.4 | 3.5 | 4.0 | 4.1 | 4.2 | 4.3 | 4.4 | 4.5 | 5.0 | 5.1 |
| 5.2 | 5.3 | 5.4 | 5.5 | 6.0 | 6.1 | 6.2 | 6.3 | 6.4 | 6.5 | 7.0 | 7.1 | 7.2 | 7.3 | 7.4 | 7.5 |
| 8.0 | 8.1 | 8.2 | 8.3 | 8.4 | 8.5 | 9.0 | 9.1 | 9.2 | 9.3 | 9.4 | 9.5 | A.0 | A.1 | A.2 | A.3 |
| A.4 | A.5 | B.0 | B.1 | B.2 | B.3 | B.4 | B.5 | C.0 | C.1 | C.2 | C.3 | C.4 | C.5 | D.0 | D.1 |
| D.2 | D.3 | D.4 | D.5 | E.0 | E.1 | E.2 | E.3 | E.4 | E.5 | F.0 | F.1 | F.2 | F.3 | F.4 | F.5 |

TB CONTENT – OPERATION 1

| 0.0 | 1.0 | 2.0 | 3.0 | 4.0 | 5.0 | 6.0 | 7.0 | 8.0 | 9.0 | A.0 | B.0 | C.0 | D.0 | E.0 | F.0 |
|---|---|---|---|---|---|---|---|---|---|---|---|---|---|---|---|
| 8.1 | 9.1 | A.1 | B.1 | C.1 | D.1 | E.1 | F.1 | 0.1 | 1.1 | 2.1 | 3.1 | 4.1 | 5.1 | 6.1 | 7.1 |
| X | X | X | X | X | X | X | X | X | X | X | X | X | X | X | X |
| X | X | X | X | X | X | X | X | X | X | X | X | X | X | X | X |
| X | X | X | X | X | X | X | X | X | X | X | X | X | X | X | X |
| X | X | X | X | X | X | X | X | X | X | X | X | X | X | X | X |

FIG. 3C

AOS CONTENT – OPERATION 2

| 0.0 | 0.1 | 0.2 | 0.3 | 0.4 | 0.5 | 1.0 | 1.1 | 1.2 | 1.3 | 1.4 | 1.5 | 2.0 | 2.1 | 2.2 | 2.3 |
|---|---|---|---|---|---|---|---|---|---|---|---|---|---|---|---|
| 2.4 | 2.5 | 3.0 | 3.1 | 3.2 | 3.3 | 3.4 | 3.5 | 4.0 | 4.1 | 4.2 | 4.3 | 4.4 | 4.5 | 5.0 | 5.1 |
| 5.2 | 5.3 | 5.4 | 5.5 | 6.0 | 6.1 | 6.2 | 6.3 | 6.4 | 6.5 | 7.0 | 7.1 | 7.2 | 7.3 | 7.4 | 7.5 |
| 8.0 | 8.1 | 8.2 | 8.3 | 8.4 | 8.5 | 9.0 | 9.1 | 9.2 | 9.3 | 9.4 | 9.5 | A.0 | A.1 | A.2 | A.3 |
| A.4 | A.5 | B.0 | B.1 | B.2 | B.3 | B.4 | B.5 | C.0 | C.1 | C.2 | C.3 | C.4 | C.5 | D.0 | D.1 |
| D.2 | D.3 | D.4 | D.5 | E.0 | E.1 | E.2 | E.3 | E.4 | E.5 | F.0 | F.1 | F.2 | F.3 | F.4 | F.5 |

TB CONTENT – OPERATION 2

| 0.0 | 1.0 | 2.0 | 3.0 | 4.0 | 5.0 | 6.0 | 7.0 | 8.0 | 9.0 | A.0 | B.0 | C.0 | D.0 | E.0 | F.0 |
|---|---|---|---|---|---|---|---|---|---|---|---|---|---|---|---|
| 8.1 | 9.1 | A.1 | B.1 | C.1 | D.1 | E.1 | F.1 | 0.1 | 1.1 | 2.1 | 3.1 | 4.1 | 5.1 | 6.1 | 7.1 |
| 0.2 | 1.2 | 2.2 | 3.2 | 4.2 | 5.2 | 6.2 | 7.2 | X | X | X | X | X | X | X | X |
| X | X | X | X | X | X | X | X | 0.3 | 1.3 | 2.3 | 3.3 | 4.3 | 5.3 | 6.3 | 7.3 |
| X | X | X | X | X | X | X | X | X | X | X | X | X | X | X | X |
| X | X | X | X | X | X | X | X | X | X | X | X | X | X | X | X |

FIG. 3D

AOS CONTENT – OPERATION 3

| 0.0 | 0.1 | 0.2 | 0.3 | 0.4 | 0.5 | 1.0 | 1.1 | 1.2 | 1.3 | 1.4 | 1.5 | 2.0 | 2.1 | 2.2 | 2.3 |
| 2.4 | 2.5 | 3.0 | 3.1 | 3.2 | 3.3 | 3.4 | 3.5 | 4.0 | 4.1 | 4.2 | 4.3 | 4.4 | 4.5 | 5.0 | 5.1 |
| 5.2 | 5.3 | 5.4 | 5.5 | 6.0 | 6.1 | 6.2 | 6.3 | 6.4 | 6.5 | 7.0 | 7.1 | 7.2 | 7.3 | 7.4 | 7.5 |
| 8.0 | 8.1 | 8.2 | 8.3 | 8.4 | 8.5 | 9.0 | 9.1 | 9.2 | 9.3 | 9.4 | 9.5 | A.0 | A.1 | A.2 | A.3 |
| A.4 | A.5 | B.0 | B.1 | B.2 | B.3 | B.4 | B.5 | C.0 | C.1 | C.2 | C.3 | C.4 | C.5 | D.0 | D.1 |
| D.2 | D.3 | D.4 | D.5 | E.0 | E.1 | E.2 | E.3 | E.4 | E.5 | F.0 | F.1 | F.2 | F.3 | F.4 | F.5 |

TB CONTENT – OPERATION 3

| 0.0 | 1.0 | 2.0 | 3.0 | 4.0 | 5.0 | 6.0 | 7.0 | 8.0 | 9.0 | A.0 | B.0 | C.0 | D.0 | E.0 | F.0 |
| 8.1 | 9.1 | A.1 | B.1 | C.1 | D.1 | E.1 | F.1 | 0.1 | 1.1 | 2.1 | 3.1 | 4.1 | 5.1 | 6.1 | 7.1 |
| 0.2 | 1.2 | 2.2 | 3.2 | 4.2 | 5.2 | 6.2 | 7.2 | 8.2 | 9.2 | A.2 | B.2 | C.2 | D.2 | E.2 | F.2 |
| 8.3 | 9.3 | A.3 | B.3 | C.3 | D.3 | E.3 | F.3 | 0.3 | 1.3 | 2.3 | 3.3 | 4.3 | 5.3 | 6.3 | 7.3 |
| X | X | X | X | X | X | X | X | X | X | X | X | X | X | X | X |
| X | X | X | X | X | X | X | X | X | X | X | X | X | X | X | X |

FIG. 3E

AOS CONTENT – OPERATION 4

| 0.0 | 0.1 | 0.2 | 0.3 | 0.4 | 0.5 | 1.0 | 1.1 | 1.2 | 1.3 | 1.4 | 1.5 | 2.0 | 2.1 | 2.2 | 2.3 |
| 2.4 | 2.5 | 3.0 | 3.1 | 3.2 | 3.3 | 3.4 | 3.5 | 4.0 | 4.1 | 4.2 | 4.3 | 4.4 | 4.5 | 5.0 | 5.1 |
| 5.2 | 5.3 | 5.4 | 5.5 | 6.0 | 6.1 | 6.2 | 6.3 | 6.4 | 6.5 | 7.0 | 7.1 | 7.2 | 7.3 | 7.4 | 7.5 |
| 8.0 | 8.1 | 8.2 | 8.3 | 8.4 | 8.5 | 9.0 | 9.1 | 9.2 | 9.3 | 9.4 | 9.5 | A.0 | A.1 | A.2 | A.3 |
| A.4 | A.5 | B.0 | B.1 | B.2 | B.3 | B.4 | B.5 | C.0 | C.1 | C.2 | C.3 | C.4 | C.5 | D.0 | D.1 |
| D.2 | D.3 | D.4 | D.5 | E.0 | E.1 | E.2 | E.3 | E.4 | E.5 | F.0 | F.1 | F.2 | F.3 | F.4 | F.5 |

TB CONTENT – OPERATION 4

| 0.0 | 1.0 | 2.0 | 3.0 | 4.0 | 5.0 | 6.0 | 7.0 | 8.0 | 9.0 | A.0 | B.0 | C.0 | D.0 | E.0 | F.0 |
| 8.1 | 9.1 | A.1 | B.1 | C.1 | D.1 | E.1 | F.1 | 0.1 | 1.1 | 2.1 | 3.1 | 4.1 | 5.1 | 6.1 | 7.1 |
| 0.2 | 1.2 | 2.2 | 3.2 | 4.2 | 5.2 | 6.2 | 7.2 | 8.2 | 9.2 | A.2 | B.2 | C.2 | D.2 | E.2 | F.2 |
| 8.3 | 9.3 | A.3 | B.3 | C.3 | D.3 | E.3 | F.3 | 0.3 | 1.3 | 2.3 | 3.3 | 4.3 | 5.3 | 6.3 | 7.3 |
| 0.4 | 1.4 | 2.4 | 3.4 | 4.4 | 5.4 | 6.4 | 7.4 | X | X | X | X | X | X | X | X |
| X | X | X | X | X | X | X | X | 0.5 | 1.5 | 2.5 | 3.5 | 4.5 | 5.5 | 6.5 | 7.5 |

FIG. 3F

AOS CONTENT – OPERATION 5

| 0.0 | 0.1 | 0.2 | 0.3 | 0.4 | 0.5 | 1.0 | 1.1 | 1.2 | 1.3 | 1.4 | 1.5 | 2.0 | 2.1 | 2.2 | 2.3 |
| --- | --- | --- | --- | --- | --- | --- | --- | --- | --- | --- | --- | --- | --- | --- | --- |
| 2.4 | 2.5 | 3.0 | 3.1 | 3.2 | 3.3 | 3.4 | 3.5 | 4.0 | 4.1 | 4.2 | 4.3 | 4.4 | 4.5 | 5.0 | 5.1 |
| 5.2 | 5.3 | 5.4 | 5.5 | 6.0 | 6.1 | 6.2 | 6.3 | 6.4 | 6.5 | 7.0 | 7.1 | 7.2 | 7.3 | 7.4 | 7.5 |
| 8.0 | 8.1 | 8.2 | 8.3 | 8.4 | 8.5 | 9.0 | 9.1 | 9.2 | 9.3 | 9.4 | 9.5 | A.0 | A.1 | A.2 | A.3 |
| A.4 | A.5 | B.0 | B.1 | B.2 | B.3 | B.4 | B.5 | C.0 | C.1 | C.2 | C.3 | C.4 | C.5 | D.0 | D.1 |
| D.2 | D.3 | D.4 | D.5 | E.0 | E.1 | E.2 | E.3 | E.4 | E.5 | F.0 | F.1 | F.2 | F.3 | F.4 | F.5 |

TB CONTENT – OPERATION 5

| 0.0 | 1.0 | 2.0 | 3.0 | 4.0 | 5.0 | 6.0 | 7.0 | 8.0 | 9.0 | A.0 | B.0 | C.0 | D.0 | E.0 | F.0 |
| --- | --- | --- | --- | --- | --- | --- | --- | --- | --- | --- | --- | --- | --- | --- | --- |
| 8.1 | 9.1 | A.1 | B.1 | C.1 | D.1 | E.1 | F.1 | 0.1 | 1.1 | 2.1 | 3.1 | 4.1 | 5.1 | 6.1 | 7.1 |
| 0.2 | 1.2 | 2.2 | 3.2 | 4.2 | 5.2 | 6.2 | 7.2 | 8.2 | 9.2 | A.2 | B.2 | C.2 | D.2 | E.2 | F.2 |
| 8.3 | 9.3 | A.3 | B.3 | C.3 | D.3 | E.3 | F.3 | 0.3 | 1.3 | 2.3 | 3.3 | 4.3 | 5.3 | 6.3 | 7.3 |
| 0.4 | 1.4 | 2.4 | 3.4 | 4.4 | 5.4 | 6.4 | 7.4 | 8.4 | 9.4 | A.4 | B.4 | C.4 | D.4 | E.4 | F.4 |
| 8.5 | 9.5 | A.5 | B.5 | C.5 | D.5 | E.5 | F.5 | 0.5 | 1.5 | 2.5 | 3.5 | 4.5 | 5.5 | 6.5 | 7.5 |

FIG. 3G

TB CONTENT

| 0.0 | 1.0 | 2.0 | 3.0 | 4.0 | 5.0 | 6.0 | 7.0 | 8.0 | 9.0 | A.0 | B.0 | C.0 | D.0 | E.0 | F.0 |
| --- | --- | --- | --- | --- | --- | --- | --- | --- | --- | --- | --- | --- | --- | --- | --- |
| 8.1 | 9.1 | A.1 | B.1 | C.1 | D.1 | E.1 | F.1 | 0.1 | 1.1 | 2.1 | 3.1 | 4.1 | 5.1 | 6.1 | 7.1 |
| 0.2 | 1.2 | 2.2 | 3.2 | 4.2 | 5.2 | 6.2 | 7.2 | 8.2 | 9.2 | A.2 | B.2 | C.2 | D.2 | E.2 | F.2 |
| 8.3 | 9.3 | A.3 | B.3 | C.3 | D.3 | E.3 | F.3 | 0.3 | 1.3 | 2.3 | 3.3 | 4.3 | 5.3 | 6.3 | 7.3 |
| 0.4 | 1.4 | 2.4 | 3.4 | 4.4 | 5.4 | 6.4 | 7.4 | 8.4 | 9.4 | A.4 | B.4 | C.4 | D.4 | E.4 | F.4 |
| 8.5 | 9.5 | A.5 | B.5 | C.5 | D.5 | E.5 | F.5 | 0.5 | 1.5 | 2.5 | 3.5 | 4.5 | 5.5 | 6.5 | 7.5 |

SOA CONTENT

| 0.0 | 1.0 | 2.0 | 3.0 | 4.0 | 5.0 | 6.0 | 7.0 | 8.0 | 9.0 | A.0 | B.0 | C.0 | D.0 | E.0 | F.0 |
| --- | --- | --- | --- | --- | --- | --- | --- | --- | --- | --- | --- | --- | --- | --- | --- |
| 0.1 | 1.1 | 2.1 | 3.1 | 4.1 | 5.1 | 6.1 | 7.1 | 8.1 | 9.1 | A.1 | B.1 | C.1 | D.1 | E.1 | F.1 |
| 0.2 | 1.2 | 2.2 | 3.2 | 4.2 | 5.2 | 6.2 | 7.2 | 8.2 | 9.2 | A.2 | B.2 | C.2 | D.2 | E.2 | F.2 |
| 0.3 | 1.3 | 2.3 | 3.3 | 4.3 | 5.3 | 6.3 | 7.3 | 8.3 | 9.3 | A.3 | B.3 | C.3 | D.3 | E.3 | F.3 |
| 0.4 | 1.4 | 2.4 | 3.4 | 4.4 | 5.4 | 6.4 | 7.4 | 8.4 | 9.4 | A.4 | B.4 | C.4 | D.4 | E.4 | F.4 |
| 0.5 | 1.5 | 2.5 | 3.5 | 4.5 | 5.5 | 6.5 | 7.5 | 8.5 | 9.5 | A.5 | B.5 | C.5 | D.5 | E.5 | F.5 |

FIG. 3H

```
CODE 400
402   inputs: num_banks, struct_size, simd_size, start_offset
404   partition_size = Highest_Common_Factor(num_banks, struct_size);
406   num_partitions = struct_size / partition_size;
408   // Load TB from AOS memory
410   for (p = 0; p < num_partitions; p++) {
412       for (i = 0; i < simd_size; i++) {
414           for (j = 0; j < partition_size; j++) {
416               aos_loc = start_offset + (i * struct_size + p * partition_size + j);
418               shift = (num_banks / partition_size);
420               TB[p * partition_size + j][(i + j * shift) % num_banks] =
422                   AOS[aos_loc / num_banks][aos_loc % num_banks];
424           }
426       }
428   }
430   // Read TB with reverse shift and save as SOA
432   for (p = 0; p < num_partitions; p++) {
434       for (j = 0; j < partition_size; j++) {
436           for (i = 0; i < simd_size; i++) {
438               shift = (num_banks / partition_size);
440               SOA[p * partition_size + j][i] =
442                   TB[p * partition_size + j][(i + j * shift) % num_banks];
444           }
446       }
448   }
```

FIG. 4

BANKED MEMORY ACCESS EFFICIENCY BY A GRAPHICS PROCESSOR

FIELD

Embodiments of the invention are generally related to memory structures, and more particularly to improving memory bus bandwidth utilization to fetch memory structures.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2014, Intel Corporation, All Rights Reserved.

BACKGROUND

The majority of electronic systems include some type of processor. Processors can be made with different architectures, and the architecture can affect how efficient the processor is at performing certain processing tasks. For example, general purpose processors tend to have one or a small number of processing cores, and are most efficient for serial processing tasks. Other types of processors can have many processing units and be more efficient at processing many smaller tasks in parallel.

Array of structures (AOS) is a convenient data format for use by software, which can be conveniently stored in memory for serial execution. However, structure of arrays (SOA) is a data format more convenient for efficient parallel execution. Thus, the two different formats are each better suited to different processor architectures. In many computing systems there are reasons to convert from AOS to SOA and/or from SOA to AOS. Traditionally, the conversion between AOS and SOA is based on the size of the underlying data structures. Thus, bus utilization or transfer bandwidth utilization in the conversion is dependent on the underlying structure size, which leads to performance degradation and power losses on a system resource (bus bandwidth) that tends to be constrained even without introducing inefficiencies in AOS to SOA conversion.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIGS. 3A-3H represent an embodiment of memory bank contents during operations of a conversion.

FIG. 4 is a representation of an embodiment of pseudo-code for converting from an array of structures to a structure of arrays.

Figure 1:
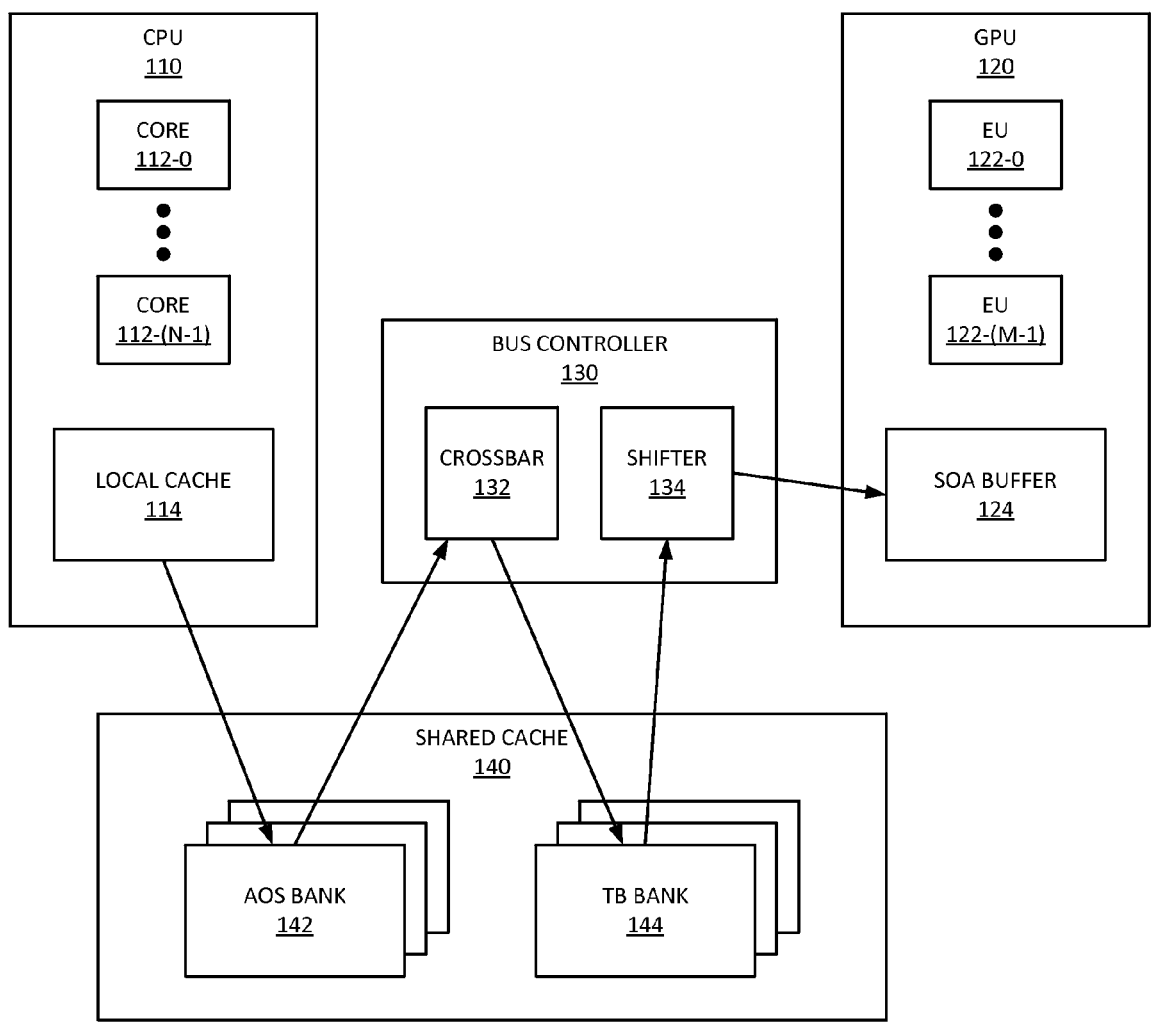
FIG. 1 is a block diagram of an embodiment of a system that performs array of structures to structure of arrays conversion.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a controller converts an array of structures (AOS) to a structure of arrays (SOA), or converts SOA to AOS. Rather than converting from one format to another based on structure size, the controller computes a partition size and other values to ensure full use of the transfer bus bandwidth between the AOS and the SOA. The transfer bus can be a register or buffer coupling the AOS and SOA structures. Thus, the controller can determine how to ensure that a number of elements are fetched that will fill the width of the bus or transfer mechanism in each operation cycle. Such an approach improves the efficiency of transfer relative to traditional approaches that transfer based on structure size, and which typically do not fill the entire transfer bus bandwidth. In addition to efficiency improvements in bandwidth utilization, use of partitions allows a system to begin generating SOA outputs sooner than with a traditional approach because the system only reads a partition at a time instead of the entire structure.

More particularly, the controller can fetch calculated portions of multiple different structures at a time, rather than fetching entire structures. The controller performs calculations to determine the correct size of the portions and the number of portions to fetch for each transfer operation. A transfer operation can be executed as a SIMD (single instruction, multiple data) operation, which performs a common or single instruction on a set of data instead of a single element of data. In one embodiment, the system that performs the conversion between AOS and SOA includes a transfer mechanism that performs a SIMD on a specific number of elements. The number of elements on which the single instruction can operate is typically referred to as the width of the SIMD, and can generally be understood as the transfer bandwidth.

Regarding the calculations, the controller can perform one or more of the following calculations. In one embodiment, the controller computes the highest common factor and uses the highest common factor as a partition size to determine how many elements of each structure to read in a fetch operation. In one embodiment, the controller computes a number of partitions, referring to a number of structures from which to read the partition size of elements. Based on these computations, the controller can spread the reading of a single structure over several different transfer operations. However, such an approach improves overall bandwidth utilization, thus improving performance and power consumption. In one embodiment, the controller also computes values related to offsetting the data in the transfer to properly align data in the desired format.

For purposes of simplicity, the following examples refer to conversion from AOS to SOA. Those of skill in the art will understand that the techniques described can also be applied to convert from SOA to AOS. Certain calculations described for AOS to SOA can also be performed for SOA to AOS. More particularly, the controller for SOA to AOS could also compute a partition size and a number of partitions to read. It will be understood that the locations to read from would be different, given the different format of the data. Thus, the controller could calculate different offsets to read the data.

FIG. 1 is a block diagram of an embodiment of a system that performs array of structures to structure of arrays conversion. System 100 includes a processing system in which an AOS is converted to an SOA. In one embodiment, system 100 includes CPU (central processing unit) 110 and GPU (graphics processing unit) 120. CPU represents a processor architecture that has a relatively small number N (e.g., one, two, four, eight, sixteen) of processing cores 112, which are designed for serial processing. CPU 110 is the host processor for system 100 and executes a host operating system.

GPU represents a processor architecture that has a relatively high number M (e.g., hundreds) of execution units (EU) 122, which are designed for small tasks to be executed in parallel. While the values of N and M can vary, in general M would be at least one order or more of magnitude greater than N. It will be understood that there are other architectures in which SIMD processing can be performed, where data stored in serial format for serial processing is converted to parallel format for parallel processing. Thus, those of skill in the art will understand that not every embodiment of a system that performs conversion between AOS and SOA for SIMD processing will include a host processor and a GPU.

In one embodiment, CPU 110 includes local cache 114, which represents one or more on-chip layers or levels of cache (e.g., L1 and L2 cache). Local cache 114 provides a cache for code and data to be executed by CPU 110. In one embodiment, system 100 includes shared cache 140, which can be a higher layer of cache than local cache 114 (e.g., L3 cache). It will be understood that shared cache 140 can be a portion of a level of cache. Thus, for example, system 100 can include other cache elements (not specifically shown) that are at the same layer as shared cache 140, but are specific to CPU 110 instead of being shared between CPU 110 and GPU 120. In one embodiment, GPU 120 includes SOA buffer 124, which represents a buffer or cache local to GPU 120 for storing data in SOA format. It will be understood that SOA buffer 124 does not necessarily represent all cache local to GPU 120.

In one embodiment, shared cache 140 is a shared lookup memory (SLM), which is a banked memory structure. A banked memory structure allows data to be stored and accessed in different banks or independently controlled arrays of storage elements or locations. A banked memory can allow concurrent access to different banks without conflicts. A memory device that is not banked must be accessed in series. Parallel access to the memory device can allow reading and writing multiple elements at a time, and thus provides a wider memory data bus.

As illustrated, shared cache 140 includes multiple AOS banks 142. AOS banks 142 represent storage locations in shared cache 140 that store AOS data. AOS banks 142 represent addressable locations of the cache, and can thus be directly accessed by an access command that provide an address. The AOS data can be accessed from AOS banks 142 by local cache 114 for operations by CPU 110. Shared cache 140 can also include TB (transpose buffer) banks 144. TB banks 144 represent buffers or registers associated with reading data out of, or writing data into, shared cache 140. In one embodiment, TB banks 144 are not addressable locations of shared cache 140, although in another embodiment they could be. TB banks 144 store data in SOA format, for transfer to a device such as GPU 120 that processes SOA data. While shown as part of the same shared cache 140, in one embodiment, AOS banks 142 and TB banks 144 can be part of, or can be considered to be part of, different memory devices. Thus, data in AOS banks 142 could be referred to as data in a first memory device and data in TB banks 144 could be referred to as data in a second memory device.

System 100 includes bus controller 130, which represents a host bus controller for the processing system. Controller 130 is or includes logic that controls the transfer of data across a memory bus (not specifically shown) or other bus that can transfer SOA and AOS data. Thus, controller 130 can be considered to control the transfer of data between CPU 110 and GPU 120 or between AOS banks 142 and TB banks 144. In one embodiment, controller 130 executes transfer operations based on code or operations executed by CPU 110 and/or by GPU 120. Controller 130 can be part of a memory controller (MC) of system 100.

In one embodiment, controller 130 includes crossbar 132. Crossbar 132 represents a transfer mechanism that allows the transfer of an element from any location in any one of a first set of banks to any location in any one of a second set of banks. In one embodiment, the first and second banks can be part of the same memory device and/or be the same banks. For purposes of AOS to SOA conversion, crossbar 132 enables execution of a SIMD operation that can read data from AOS bank 142 and transfer it to TB bank 144 in a single cycle or single operation. Crossbar 132 also enables the reverse operation for SOA to AOS conversion.

In one embodiment controller 130 includes shifter 134. Shifter 134 represents logic to shift data among banks, based on a provided offset. In one embodiment, shifter 134 could be considered a rotator, which rotates data along a fixed element location of different banks. In one embodiment, controller 130 performs certain calculations to transfer data between AOS and SOA formats. In one embodiment, shifter 134 rotates SOA data stored in TB banks 144 into aligned SOA data to be stored in SOA buffer 124.

In one embodiment, shared cache 140 has many banks of memory (e.g., 16 banks). While AOS banks 142 and TB banks 144 are shown in system 100, it will be understood that shared cache 140 can simply be a memory device with multiple banks of memory, and certain areas store data formatted in accordance with AOS. Other data may be stored in the banks or transferred from the memory via transfer mechanisms (registers, output buffers, drivers, and other components) in a format different than the AOS format of the data stored in the banks. In one embodiment, TB banks 144 have a maximum depth of 16, but can be any depth, seeing the depth is an implementation specific detail. In one embodiment, AOS data can be read by performing a modulo operation on the address data to find a bank number, with the result of the operation representing an address or element in the bank.

Figure 2:
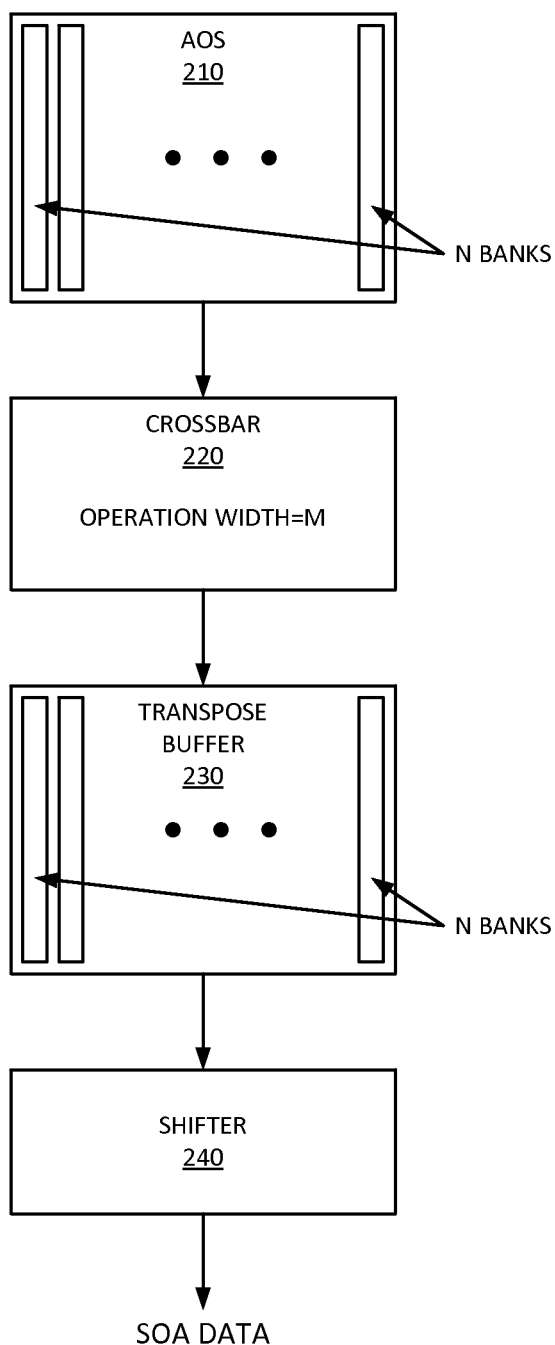
FIG. 2 is a block diagram of an embodiment of a system architecture for converting from array of structures to structure of arrays in a shared banked memory.

FIG. 2 is a block diagram of an embodiment of a system architecture for converting from array of structures to structure of arrays in a shared banked memory. In one embodiment, system 200 can be one example of system 100 of FIG. 1. The architecture of system 200 represents the architectural flow of data for an AOS to SOA conversion. AOS 210 represents data stored in AOS format, having data structures stored serially across N banks. Crossbar 220 has an operation width of M, which is a transfer bandwidth allowing M elements to be moved from AOS 210 to TB (transpose buffer) 230 in a single operation cycle. In one embodiment, M is equal to N. TB 230 is also shown as storing data in N banks. TB 230 stores data read from AOS 210 in SOA format, as converted by operation of crossbar 220.

AOS 210 stores multiple structures. The size of each structure is assumed to be the same. In practice, data that is of approximately the same size (or the same number of elements) can be stored in equal-sized structures. It will be understood that system 200 should transfer M elements of data in each operation for the maximum bandwidth utilization. In one embodiment, a controller (e.g., a bus controller and/or a host processor) computes a highest common factor between a structure size of structures in AOS 210 and N (the number of banks in the AOS). The highest common factor can actually be the structure size of the structures for certain system configurations. In such a configuration, the AOS to SOA conversion would look the same as the traditional approach of reading entire structures to transfer. However, when the highest common factor is different than the structure size, the AOS to SOA conversion described is more efficient than the traditional approach. Instead of transferring entire structures, the controller can use a partition size to read portions of multiple structures for each transfer. The controller sets the partition size value based on the highest common factor computed (e.g., partition size=highest common factor).

It will be understood that if the system does not read an entire structure in each operation, the system needs to keep track of what portions of each structure to read for each operation. In one embodiment, the system computes an offset value, which can be referred to as a shift value, which can be equal to N divided by the partition size. In one embodiment, the controller or processor computes each of these values prior to beginning any transfer operations. In one embodiment, the controller can compute the values as needed. In one embodiment, M=N, or the transfer bandwidth is equal to the number of banks. In one embodiment, M has a value other than N, in which case, the highest common factor can be determined based on the transfer bandwidth instead of the number of banks.

In one embodiment, the controller can instruct crossbar 220 to read a partition-size-value number of elements from an offset-value number of structures. Again, if M=N, then crossbar 220 reads N elements. If M is different than N, crossbar 220 reads a number of elements equal to min(M, N). In either case the point is to maximize the transfer bandwidth. Crossbar 220 then transfers the elements read to TB 230 in a single operation cycle (e.g., SIMD operation). The data written to TB 230 will be converted to SOA format instead of being in AOS format as read from AOS 210. The controller will continue to have crossbar 220 read and transfer elements for a number of operation cycles necessary to transfer the entire AOS data to TB 230. In one embodiment, the reading and transferring is performed continuously. In one embodiment, system 200 may need to interrupt the reading and transferring to allow TB 230 to transfer data out to make room for more data from AOS 210.

It will be understood that best transfer utilization occurs when M=N and when the number of banks in TB 230 is equal to the number of banks in AOS 210. However, similar techniques as those described can be applied to systems in which the number of banks in TB 230 is different from the number of banks in AOS 210, and/or when the number of elements crossbar 220 can transfer in a single cycle is different from the number of banks in AOS 210 and/or TB 230. In such implementations, partitioning the structure in portions and reading out those portions can still provide transfer efficiency improvements.

FIGS. 3A-3H represent an embodiment of memory bank contents during operations of a conversion. The following describe operations for AOS to SOA conversion. In one embodiment, the AOS includes a number of banks where AOS data is stored, and a TB includes an equal number of banks as the AOS. A crossbar or transfer mechanism can move data from any bank of the AOS to any bank of the TB. As shown, the conversion introduces a shift when writing from the AOS to the TB, to avoid conflicts that would be generated by attempting to write to elements to the same bank in the same operation. The system can include a shifter to rotate the data to its proper alignment.

FIG. 3A represents contents of an array of structures. Each entry or element is a component of a structure. The structure components are identified by a pair of numbers separated by a dot. The first number is the structure offset and the second number is the component offset inside the structure. Thus, the structure size is 6 elements. As illustrated, the bank size is 16, and thus the AOS is 16 elements wide. Each structure is delineated in the drawing by a start and a stop point, as well as different shading for adjacent structures. It will be understood that the structures are organized serially in the AOS, with one element per bank until the last bank at which the structures wrap back to the first bank. Thus, Structure 0 is stored in the first row of Banks 0-5, Structure 1 is stored in the first row of Banks 6-11, and Structure 2 is stored in the first row of Banks 12-15 and the second row of Banks 0-1. The AOS illustrated contains 16 structures, and thus occupies 6 full rows.

In one embodiment, it is assumed that the transfer bandwidth is equal to the number of banks (16). Thus, the system has the capacity to transfer up to 16 elements per operation cycle. In traditional methods, the system controller can perform an integer division to determine that the number of complete structures and transfer bandwidth (16) divided by the structure size (6) gives a result of 2 (16/6=2). A traditional approach would thus read and transfer two entire structures per operation cycle. As described herein, the system controller can determine the highest common factor (HCF) between the number of banks (16) and the size of the structure (6) for a result of 2 (16=2*2*2*2; 6=2*3; HCF=2). The system controller can also determine that the transfer bandwidth divided by the HCF gives a result of 8 (16/2=8), which means that 2 elements (the HCF or partition size) should be read from 8 (the transfer divided by the HCF) different structures for each operation cycle, for a total of 16 elements read each cycle. It will be understood that such an approach will produce a round number each time, filling the bandwidth for each transfer operation.

Assume for discussion that a variable num_banks represents a number of banks in the TB (and the AOS), and that simd_size represents a transfer bandwidth, or a width of the crossbar. Assume also that a variable struct_size represent the size of the structure in the AOS, and that partition_size represents a number of elements to read from each structure in a single operation. Thus, the example shown can be represented as num_banks=16, simd_size=16, struct_size=6, and partition_size=Highest_Common_Factor (num_banks, struct_size)=2.

FIG. 3B illustrates Operation 0 based on the above calculations. As shown, two elements each are read from eight different structures. Namely, in Operation 0, the crossbar reads elements [0.0], [0.1], [1.0], [1.1], . . . , [7.0], [7.1]. The crossbar can transfer the elements to the TB with all "first" elements of the structures in the top row of the TB, and all "second" elements in the second row of the TB. Thus, the system places elements [0.0], [1.0], . . . , [7.0] in the first row of Banks 0-7 and elements [0.1], [1.1], . . . , [7.1] in the second row of Banks 8-15, respectively. It will be understood that in a single operation, only a single bank can be read from and written to. Thus, the system reads content from all 16 AOS banks, one element from each. Similarly, the system writes to all 16 banks of the TB, one element to each.

FIG. 3C illustrates Operation 1 in which the system reads elements [8.0], [9.0], . . . , [F.0] and [8.1], [9.1], . . . , [F.1] from the AOS and transfers them to the TB. More specifically, the crossbar places elements [8.0], [9.0], . . . , [F.0] in the first row of Banks 8-15, and elements [8.1], [9.1], . . . , [F.1] in the second row of Banks 0-7, respectively. FIG. 3D illustrates Operation 2 in which the system reads and transfers elements [0.2], [0.3], [1.2], [1.3], . . . , [7.2], [7.3]. FIG. 3E illustrates Operation 3 in which the system reads and transfers elements [8.2], [8.3], [9.2], [9.3], . . . , [F.2], [F.3]. FIG. 3F illustrates Operation 4 in which the system reads and transfers elements [0.4], [0.5], [1.4], [1.5], . . . , [7.4], [7.5]. FIG. 3G illustrates Operation 5 in which the system reads and transfers elements [8.4], [8.5], [9.4], [9.5], . . . , [F.4], [F.5]. The system performs Operations 2, 3, 4, and 5 in a similar manner to Operations 0 and 1.

FIG. 3H represents the contents of the TB after Operation 5. It will be observed that every other row of the TB content is rotated or shifted by eight banks. In one embodiment, the system includes a shifter to shift or rotate the data to its proper alignment, as shown in the SOA content, which reflects the TB content, but rotated to align elements of the same structures. Thus, the system can align elements of common structures into common banks. For example, Bank 0 holds all elements of Structure 0: [0.0], [0.1], [0.2], [0.3], [0.4], and [0.5]. Bank 1 holds all elements of Structure 1, and so forth. The expression common structures in common banks refers to having a single structure in a single bank, and does not necessarily mean that Bank 0 must hold Structure 0 or Bank 7 must hold Structure 7. The shift operation could have shifted the first, third, and fifth rows, for example, to align the elements of common structures in common banks. In such an implementation, Bank 0 would hold Structure 8, and Bank 9 would hold Structure 0.

FIG. 4 is a representation of an embodiment of pseudocode for converting from an array of structures to a structure of arrays. Code 400 shows one example of pseudocode to implement the conversion or a converter, which could be one example of code to implement a conversion in accordance with FIGS. 3A-3H. Thus, code 400 describes an AOS to SOA converter. Those of skill in the art will understand how to modify code 400 to for SOA to AOS conversion. Code 400 can be executed by a system controller or host bus controller. In one embodiment, code 400 is executed by a host processor, which causes the host processor to generate commands to cause a host bus controller to execute specific operations to implement the code.

In one embodiment, the code receives as inputs the values num_banks, struct_size, simd_size, and start_offset, line 402. In one embodiment, one or more of the values is passed as arguments to a function call for code 400. In one embodiment, one or more of the values is hard coded into code 400 based on prior knowledge about the system in which the code will be executed. In one embodiment, code 400 accesses the values from information stored external to the code (e.g., querying or calling the values from another place in system code). Num_banks represents a number of banks in the AOS. In one embodiment, the number of banks in the TB is the same as the number of banks in the AOS. Start_offset represents number to identify an address or location of the AOS where code 400 will begin to read structures. Start_offset can be a pointer to the address location where the code will begin to execute.

In one embodiment, the controller calculates a value partition_size, equal to the HCF of num_banks and struct_size, line 404. The controller can also calculate a value num_partitions equal to struct_size divided by partition_size, line 406. The value partition_size is the portion of a structure that will be read in a single operation. The value num_partitions is how many portions will be read in a single operation. It will be understood that each of the num_partitions will be read from a different structure. Traditional conversion approaches can only provide full transfer bandwidth utilization when struct_size is a factor of num_banks. However, as described herein with partitioning of the structures, the conversion can provide full transfer bandwidth for any structure size as long as simd_size is a multiple of (num_banks/partition_size).

Line 408 identifies the operations of code 400 that can load the TB from the AOS memory. In one embodiment, the operations can be executed as nesting of loops. The outer loop executes num_partitions times, once for each partition until an entire structure is read, line 410. In the example of FIGS. 3A-3H, FIGS. 3B and 3C illustrate transferring the first partition (the first two elements of each structure), FIGS. 3D and 3E illustrate transferring the second partition (the second two elements of each structure), and FIGS. 3F and 3G illustrate transferring the last partition (the last two elements of each structure).

The middle loop executes simd_size times, once for each structure to convert, line 412. While in the examples, the AOS is shown only containing 16 structures, it will be understood that the AOS can contain any number of structure to convert. The reason to illustrate 16 structures is to show that one set of operations will convert a number of structures equal to the width of the transfer mechanism, which is ideally the same size as the number of banks in the SOA. The goal of the conversion from AOS to SOA is to have a single structure in a single bank. Thus, the number of structures read is equal to the simd_size, or the width or number of banks that can be transferred to at a time. Thus, the middle loop executes simd_size times, to read a full bandwidth of structures.

The inner loop executes partition_size times, once for each element to be read from each structure in a single operation, line 414. Within the inner loop, code 400 computes aos_loc, which represents a location or address of the AOS to read from, line 416. The AOS location is computed as a fixed value start_offset plus a variable value. As explained above, start_offset is an initial location to read from the AOS. The variable value is within the parenthetical statement, and is the structure variable (i) times struct_size plus the partition variable (p) times partition_size plus the element or component variable (j). Continuing in the inner loop, in one embodiment, code 400 computes a shift value equal to num_banks divided by partition_size, line 418. The shift value is the amount to shift to align the elements of a structure with other elements from the same structure (to align elements of the same structure into the same bank).

In one embodiment, code 400 can use the location identified by aos_loc, and the shift value to transfer or write data to the TB. The TB for a specified location, line 420, receives the contents of the AOS at a specified location, line 422. The element identifier for the TB is determined by the solution of the first bracketed TB value, which is p*partition_size+j. The bank for the TB is determined by the solution of the second bracketed TB value, which is the quantity (i+j*shift) mod num_banks. The location within the banks of AOS is determined by the solution of the first bracketed AOS value, which is aos_loc divided by num_banks. The bank of the element of the AOS is determined by the solution of the second bracketed AOS value, which is aos_loc mod num_banks. The inner loop ends at line 424. The middle loop ends at line 426. The outer loop ends at line 428.

In one embodiment, a first set of nested loops reads the AOS data to the TB, and a second set of nested loops transfers the data from the TB to an SOA, including shifting the data. Line 430 indicates the portion of code 400 that provides an example of performing a reverse shift (to undo the shift caused while writing the TB) and saving the TB content as SOA content.

The outer loop executes num_partitions times, once for each partition until an entire structure is read, line 432. The middle loop executes partition_size times, once for each element of the structure to be read, line 434. The middle loop executes simd_size times, once for each structure to be read and saved, line 436. Within the inner loop, in one embodiment, code 400 computes shift value equal to num_banks divided by partition_size, line 438. It will be understood that the shift value can be computed prior to the loops, similar to num_partitions, and used in the loops. The shift value in the inner loop can reverse the shift introduced when reading AOS content.

In one embodiment, the SOA data is identified as a bank and element value, to be assigned shifted data identified from a bank and element value for the TB. The SOA bank is identified by the variable i. The location within the bank is identified by computing p*partition_size plus j, line 440. The TB bank is identified by the quantity (i+j*shift) mod num_banks. The location within the bank is identified by p*partition_size plus j, line 442. The inner loop ends at line 444. The middle loop ends at line 446. The outer loop ends at line 448.

It will be understood that code 400 has similar features to a traditional approach to AOS to SOA conversion, but with the partition size acting similar to the structure size of traditional solutions. Since the solution effectively "resizes" the structures, the outer loop allows iterating through all partitions to capture the entire structure. At line 420 the TB is the target of the data, and shifts the data read. At line 442 the TB is the source, and the shift reverses the shift introduced into the data at line 420.

Figure 5:
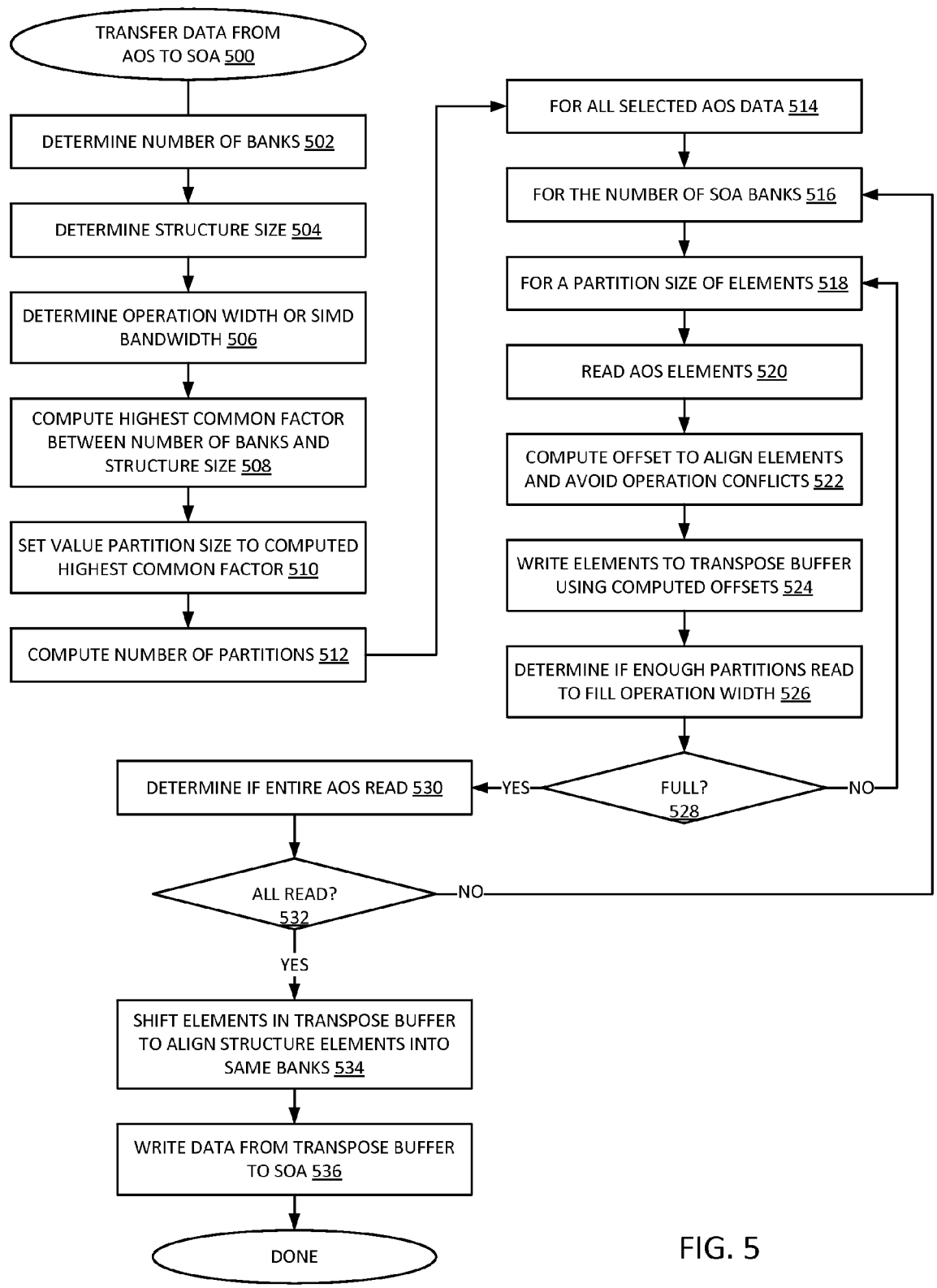
FIG. 5 is a flow diagram of an embodiment of a process for converting from an array of structures to a structure of arrays.

FIG. 5 is a flow diagram of an embodiment of a process for converting from an array of structures to a structure of arrays. Process 500 provides for the conversion of data from AOS to SOA. In one embodiment, the system determines the number of banks available to store AOS data and to store SOA data, 502. Typically the number of AOS banks will be equal to the number of SOA banks. The number of banks can be set in some configurations as a fixed value. In other implementations, the system can obtain the number of banks from system configuration information. In one embodiment, the system determines the structure size, 504. The structure size can be a common container size to store data.

In one embodiment, the system determines an operation width or SIMD bandwidth, 506. The operation width indicates how many elements can be transferred in one operation cycle from AOS to SOA. It is common for the operation width to equal the number of banks. The system computes a highest common factor between the number of banks or the SIMD bandwidth size and the structure size, 508. It will be understood that if the size of SIMD is not the same as the number of banks, the system computes the highest common factor based on the number of banks rather than on SIMD bandwidth. The system sets a partition size variable value to the computed highest common factor, 510. Instead of reading entire structures at a time, the system will read portions of structures at a time in the conversion. The system can compute a number of partitions to transfer in each operation cycle, 512. The number of partitions to transfer is the number it will take to fill the SIMD bandwidth.

It will be understood that an AOS to SOA conversion will operate on a number of structures at a time, to transfer a number of structures equal to the number of banks of SOA data that will be generated. With such an approach, each bank will contain an entire structure after the conversion operations. There may be more AOS data than the number of banks of SOA, in which case another conversion can be executed on other AOS data. In one embodiment, the system keeps a pointer to indicate an initial address for conversion operations.

Thus, the system performs a loop of operations for all selected AOS data, 514. In one embodiment, the system will iterate through the number of banks of SOA data, 516. For each iteration of the number of banks of SOA data, the system can iterate for a partition size of elements, 518, which is the partition size that was previously computed. For each iteration of the partition size number of elements, the system reads AOS elements, 520. The system can compute an offset to align elements and avoid operation conflicts, 522. Such conflicts can be, for example, trying to read or write multiple elements in one bank in a single operation cycle. The system can write the elements of AOS data to the TB using the computed offsets, 524. The system then iterates to the next partition element, and continues until the entire length of the partition size has been reached.

The system can then determine if enough partitions have been read to fill the operation width, 526. If the operation width is not full, 528 NO branch, the system will continue its iteration to a subsequent partition, 518. If the operation width is full, 528 YES branch, the system can determine if all structures of the selected AOS data has been read, 530. If all AOS data has not been read, 532 NO branch, the system can continue to iterate until all structures have been read, 516. When all selected AOS structures have been read 532 YES branch, in one embodiment, the system can shift elements from the TB to align the structure elements into the same banks, 534. The system can then write the shifted data from the TB into the SOA, 536.

Figure 6:
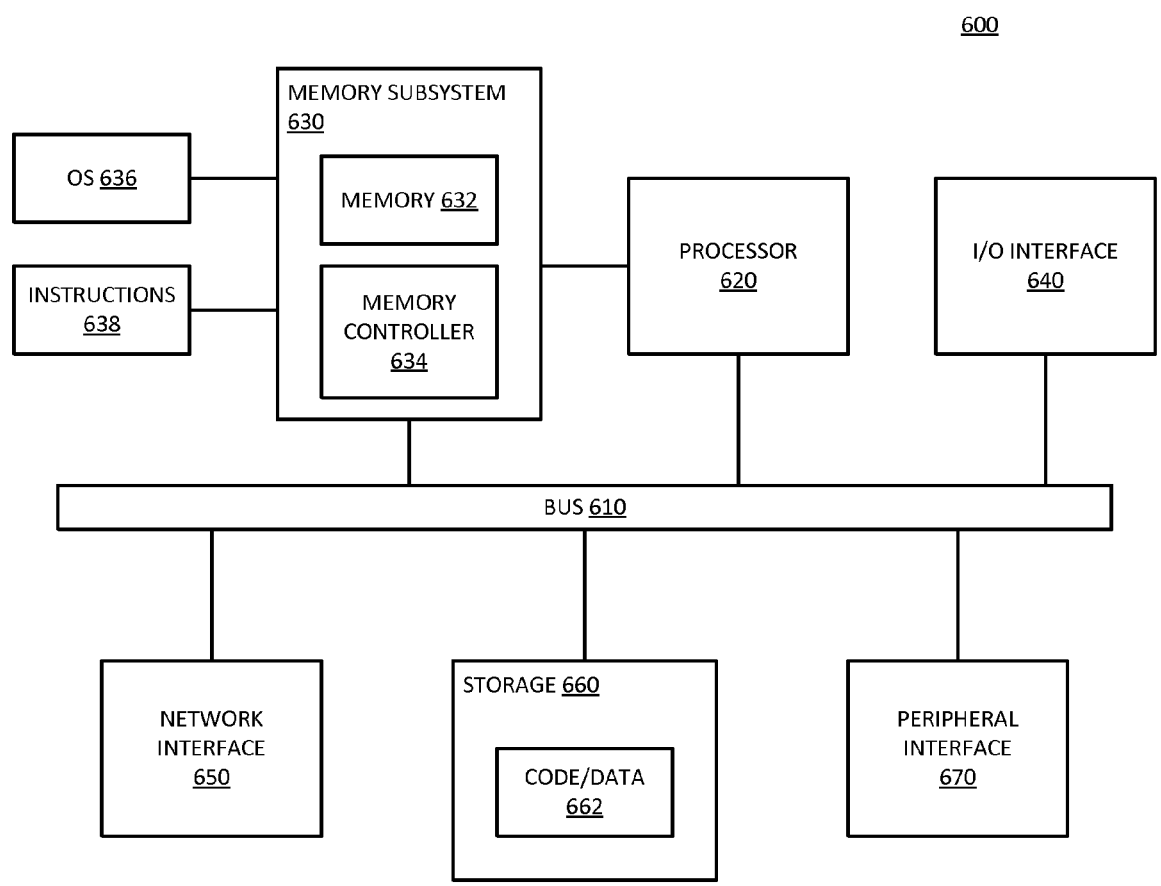
FIG. 6 is a block diagram of an embodiment of a computing system in which AOS to SOA conversion can be implemented.

FIG. 6 is a block diagram of an embodiment of a computing system in which conversion between AOS and SOA can be implemented. System 600 represents a computing device in accordance with any embodiment described herein, and can be a laptop computer, a desktop computer, a server, a gaming or entertainment control system, a scanner, copier, printer, routing or switching device, or other electronic device. System 600 includes processor 620, which provides processing, operation management, and execution of instructions for system 600. Processor 620 can include any type of microprocessor, central processing unit (CPU), processing core, or other processing hardware to provide processing for system 600. Processor 620 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 630 represents the main memory of system 600, and provides temporary storage for code to be executed by processor 620, or data values to be used in executing a routine. Memory subsystem 630 can include one or more memory devices such as read-only memory (ROM), flash memory, one or more varieties of random access memory (RAM), or other memory devices, or a combination of such devices. Memory subsystem 630 stores and hosts, among other things, operating system (OS) 636 to provide a software platform for execution of instructions in system 600. Additionally, other instructions 638 are stored and executed from memory subsystem 630 to provide the logic and the processing of system 600. OS 636 and instructions 638 are executed by processor 620. Memory subsystem 630 includes memory device 632 where it stores data, instructions, programs, or other items. In one embodiment, memory subsystem includes memory controller 634, which is a memory controller to generate and issue commands to memory device 632. It will be understood that memory controller 634 could be a physical part of processor 620.

Processor 620 and memory subsystem 630 are coupled to bus/bus system 610. Bus 610 is an abstraction that represents any one or more separate physical buses, communication lines/interfaces, and/or point-to-point connections, connected by appropriate bridges, adapters, and/or controllers. Therefore, bus 610 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 610 can also correspond to interfaces in network interface 650.

System 600 also includes one or more input/output (I/O) interface(s) 640, network interface 650, one or more internal mass storage device(s) 660, and peripheral interface 670 coupled to bus 610. I/O interface 640 can include one or more interface components through which a user interacts with system 600 (e.g., video, audio, and/or alphanumeric interfacing). In one embodiment, I/O interface 640 includes one or more components such as physical connectors and drivers to interface with a digital display device that displays data executed and computed by processor 620 and/or data stored in memory subsystem 630. Network interface 650 provides system 600 the ability to communicate with remote devices (e.g., servers, other computing devices) over one or more networks. Network interface 650 can include an Ethernet adapter, wireless interconnection components, USB (universal serial bus), or other wired or wireless standards-based or proprietary interfaces.

Storage 660 can be or include any conventional medium for storing large amounts of data in a nonvolatile manner, such as one or more magnetic, solid state, or optical based disks, or a combination. Storage 660 holds code or instructions and data 662 in a persistent state (i.e., the value is retained despite interruption of power to system 600). Storage 660 can be generically considered to be a "memory," although memory 630 is the executing or operating memory to provide instructions to processor 620. Whereas storage 660 is nonvolatile, memory 630 can include volatile memory (i.e., the value or state of the data is indeterminate if power is interrupted to system 600).

Peripheral interface 670 can include any hardware interface not specifically mentioned above. Peripherals refer generally to devices that connect dependently to system 600. A dependent connection is one where system 600 provides the software and/or hardware platform on which operation executes, and with which a user interacts.

In one embodiment, processor 620 includes one or more memory devices in which data can be stored in one or more data formats. The data can be converted from AOS to SOA or SOA to AOS as described herein. As described herein, a host bus controller and/or processor 620 perform computations and conversion operations to partition the data structures and transfer structure data in portions or partitions, instead of in whole structures. For implementations in which the transfer bandwidth is a multiple of structure size, the portion size can be equal to the structure size. Otherwise, the system transfers elements from multiple different structures in a single operation cycle. In one embodiment, such a conversion can occur with at least one memory device that is part of memory subsystem 630.

Figure 7:
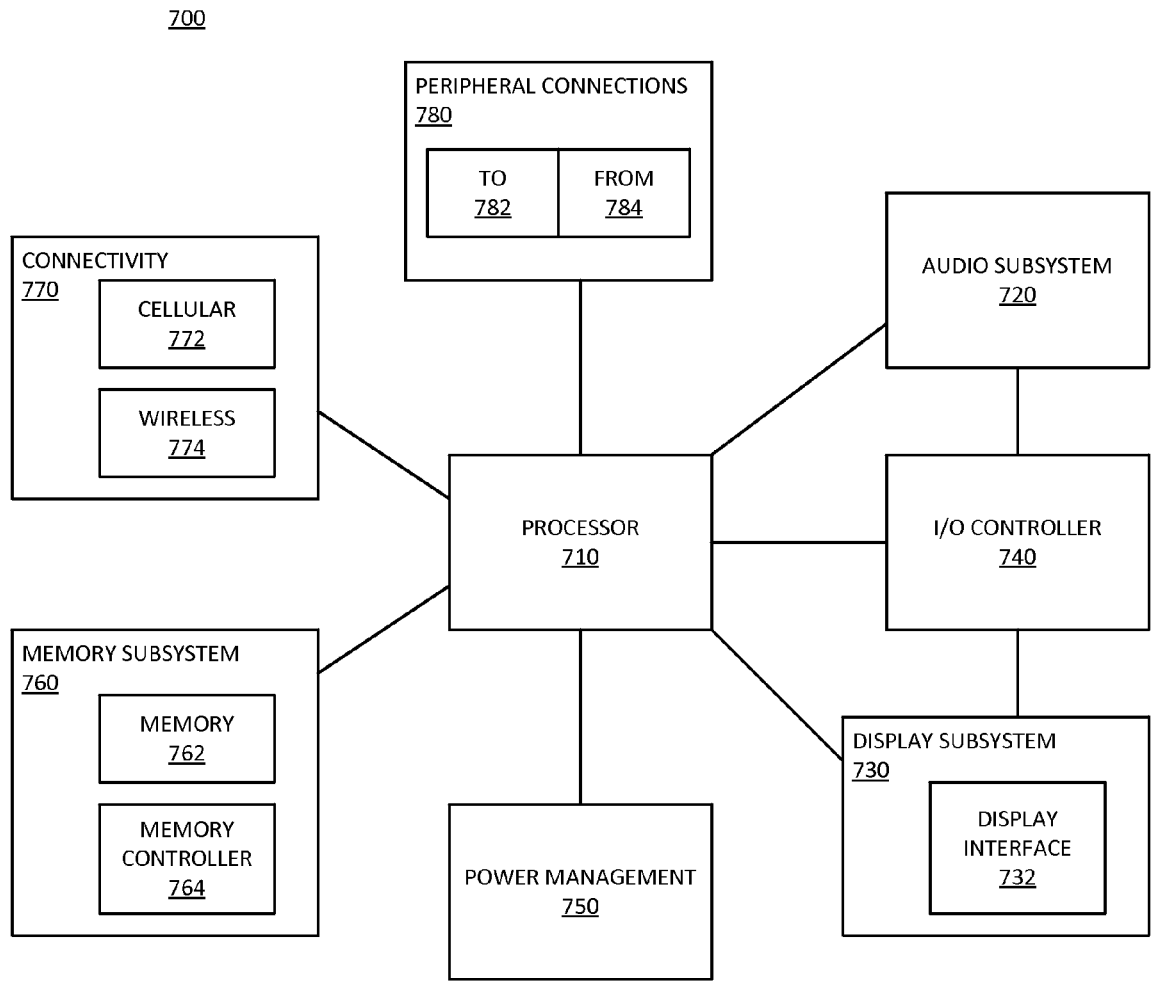
FIG. 7 is a block diagram of an embodiment of a mobile device in which AOS to SOA conversion can be implemented.

FIG. 7 is a block diagram of an embodiment of a mobile device in which conversion between AOS and SOA can be implemented. Device 700 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 700.

Device 700 includes processor 710, which performs the primary processing operations of device 700. Processor 710 can include one or more physical devices, such as microprocessors, application processors, microcontrollers, programmable logic devices, or other processing means. The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations can also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 includes display interface 732, which includes the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user. In one embodiment, display subsystem 730 includes one or more components such as physical connectors and drivers to interface with a digital display device that displays data executed and computed by processor 710 and/or data stored in memory subsystem 760.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to device 700 through which a user might interact with the system. For example, devices that can be attached to device 700 might include microphone devices, speaker or stereo systems, video systems or other display device, keyboard or keypad devices, or other I/O devices for use with specific applications such as card readers or other devices.

As mentioned above, I/O controller 740 can interact with audio subsystem 720 and/or display subsystem 730. For example, input through a microphone or other audio device can provide input or commands for one or more applications or functions of device 700. Additionally, audio output can be provided instead of or in addition to display output. In another example, if display subsystem includes a touchscreen, the display device also acts as an input device, which can be at least partially managed by I/O controller 740. There can also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that can be included in device 700. The input can be part of direct user interaction, as well as providing environmental input to the system to influence its operations (such as filtering for noise, adjusting displays for brightness detection, applying a flash for a camera, or other features). In one embodiment, device 700 includes power management 750 that manages battery power usage, charging of the battery, and features related to power saving operation.

Memory subsystem 760 includes memory device(s) 762 for storing information in device 700. Memory subsystem 760 can include nonvolatile (state does not change if power to the memory device is interrupted) and/or volatile (state is indeterminate if power to the memory device is interrupted) memory devices. Memory 760 can store application data, user data, music, photos, documents, or other data, as well as system data (whether long-term or temporary) related to the execution of the applications and functions of system 700. In one embodiment, memory subsystem 760 includes memory controller 764 (which could also be considered part of the control of system 700, and could potentially be considered part of processor 710). Memory controller 764 includes a scheduler to generate and issue commands to memory device 762.

Connectivity 770 includes hardware devices (e.g., wireless and/or wired connectors and communication hardware) and software components (e.g., drivers, protocol stacks) to enable device 700 to communicate with external devices. The external device could be separate devices, such as other computing devices, wireless access points or base stations, as well as peripherals such as headsets, printers, or other devices.

Connectivity 770 can include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector can allow device 700 to connect to certain peripherals that allow device 700 to control content output, for example, to audiovisual or other systems.

In addition to a proprietary docking connector or other proprietary connection hardware, device 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, processor 710 includes one or more cache memory devices in which data can be stored in one or more data formats. The data can be converted from AOS to SOA or SOA to AOS as described herein. As described herein, a host bus controller and/or processor 710 perform computations and conversion operations to partition the data structures and transfer structure data in portions or partitions, instead of in whole structures. For implementations in which the transfer bandwidth is a multiple of structure size, the portion size can be equal to the structure size. Otherwise, the system transfers elements from multiple different structures in a single operation cycle. In one embodiment, such a conversion can occur with at least one memory device that is part of memory subsystem 760.

In one aspect, a method includes: computing a highest common factor between a structure size of structures in an array of structures and a number of banks in a first memory device, wherein the highest common factor is different than a structure size of the structures; setting a partition size value to the computed highest common factor; computing a shift value equal to the number of banks divided by the partition size; reading in one operation cycle, a number of elements equal to the partition size from a number of structures equal to the shift value; transferring in the one operation cycle the elements read to a structure of arrays in a second memory device having an equal number of banks as the first memory device; and continuing the reading and transferring in subsequent operation cycles until all elements of the array of structures is transferred to the structure of arrays.

In one embodiment, the first memory device and the second memory device are different portions of a single, shared memory device. In one embodiment, transferring the elements read to a structure of arrays further comprises: computing a modulo operation of a base equal to the number of banks to determine a location in the structure of arrays to which to transfer the elements. In one embodiment, transferring the elements read to a structure of arrays further comprises: executing a single instruction, multiple data (SIMD) operation to transfer the elements read. In one embodiment, transferring the elements read to the structure of arrays comprises transferring elements read from an array of structures associated with a host processor to a structure of arrays associated with a graphics processor. In one embodiment, the method further comprising: shifting the data elements transferred to the structure of arrays to align elements of common structures into common banks.

In one aspect, an apparatus includes: a first memory device having a number of banks to store data elements in an array of structure format; a second memory device having the number of banks to store data elements in a structure of arrays format; and a controller device to transfer the data elements from the first memory device to the second memory device, including the controller device being configured to compute a highest common factor between a structure size of structures in the array of structures and the number of banks in the first memory device, wherein the highest common factor is different than a structure size of the structures; set a partition size value to the computed highest common factor; compute a shift value equal to the number of banks divided by the partition size; read in one operation cycle, a number of elements equal to the partition size from a number of structures equal to the shift value; transfer in the one operation cycle the elements read to the structure of arrays in the second memory device; and continue the reading and transferring in subsequent operation cycles until all elements of the array of structures is transferred to the structure of arrays.

In one embodiment, the first memory device and the second memory device are different portions of a single, shared memory device. In one embodiment, the controller is to transfer the elements read to a structure of arrays including computing a modulo operation of a base equal to the number of banks to determine a location in the structure of arrays to which to transfer the elements. In one embodiment, the controller is to transfer the elements read to a structure of arrays including executing a single instruction, multiple data (SIMD) operation to transfer the elements read. In one embodiment, the controller is to transfer the elements read to the structure of arrays including transferring elements read from an array of structures associated with a host processor to a structure of arrays associated with a graphics processor. In one embodiment, further comprising the controller to shift the data elements transferred to the structure of arrays to align elements of common structures into common banks.

In one aspect, an electronic device includes: a host processor device; a circuit coupled to the host processor device, the circuit including a first memory device having a number of banks to store data elements in an array of structure format; a second memory device having the number of banks to store data elements in a structure of arrays format; and a controller device to transfer the data elements from the first memory device to the second memory device, including the controller device being configured to compute a highest common factor between a structure size of structures in the array of structures and the number of banks in the first memory device, wherein the highest common factor is different than a structure size of the structures; set a partition size value to the computed highest common factor; compute a shift value equal to the number of banks divided by the partition size; read in one operation cycle, a number of elements equal to the partition size from a number of structures equal to the shift value; transfer in the one operation cycle the elements read to the structure of arrays in the second memory device; and continue the reading and transferring in subsequent operation cycles until all elements of the array of structures is transferred to the structure of arrays; and a digital display interface to couple to a display device to display data computed by the host processor.

In one embodiment, the first memory device and the second memory device are different portions of a single, shared memory device. In one embodiment, the controller is to transfer the elements read to a structure of arrays including computing a modulo operation of a base equal to the number of banks to determine a location in the structure of arrays to which to transfer the elements. In one embodiment, the controller is to transfer the elements read to a structure of arrays including executing a single instruction, multiple data (SIMD) operation to transfer the elements read. In one embodiment, the controller is to transfer the elements read to the structure of arrays including transferring elements read from an array of structures associated with a host processor to a structure of arrays associated with a graphics processor. In one embodiment, further comprising the controller to shift the data elements transferred to the structure of arrays to align elements of common structures into common banks.

In one aspect, an article of manufacture comprising a computer readable storage medium having content stored thereon, which when executed performs operations including: computing a highest common factor between a structure size of structures in an array of structures and a number of banks in a first memory device, wherein the highest common factor is different than a structure size of the structures; setting a partition size value to the computed highest common factor; computing a shift value equal to the number of banks divided by the partition size; reading in one operation cycle, a number of elements equal to the partition size from a number of structures equal to the shift value; transferring in the one operation cycle the elements read to a structure of arrays in a second memory device having an equal number of banks as the first memory device; and continuing the reading and transferring in subsequent operation cycles until all elements of the array of structures is transferred to the structure of arrays.

In one embodiment, the first memory device and the second memory device are different portions of a single, shared memory device. In one embodiment, the content for transferring the elements read to a structure of arrays further comprises content for computing a modulo operation of a base equal to the number of banks to determine a location in the structure of arrays to which to transfer the elements. In one embodiment, the content for transferring the elements read to a structure of arrays further comprises content for executing a single instruction, multiple data (SIMD) operation to transfer the elements read. In one embodiment, the content for transferring the elements read to the structure of arrays comprises content for transferring elements read from an array of structures associated with a host processor to a structure of arrays associated with a graphics processor. In one embodiment, further comprising content for shifting the data elements transferred to the structure of arrays to align elements of common structures into common banks.

In one aspect, an apparatus includes: means for computing a highest common factor between a structure size of structures in an array of structures and a number of banks in a first memory device, wherein the highest common factor is different than a structure size of the structures; means for setting a partition size value to the computed highest common factor; means for computing a shift value equal to the number of banks divided by the partition size; means for reading in one operation cycle, a number of elements equal to the partition size from a number of structures equal to the shift value; means for transferring in the one operation cycle the elements read to a structure of arrays in a second memory device having an equal number of banks as the first memory device; and means for continuing the reading and transferring in subsequent operation cycles until all elements of the array of structures is transferred to the structure of arrays.

In one embodiment, the first memory device and the second memory device are different portions of a single, shared memory device. In one embodiment, the means for transferring the elements read to a structure of arrays further comprises means for computing a modulo operation of a base equal to the number of banks to determine a location in the structure of arrays to which to transfer the elements. In one embodiment, the means for transferring the elements read to a structure of arrays further comprises means for executing a single instruction, multiple data (SIMD) operation to transfer the elements read. In one embodiment, the means for transferring the elements read to the structure of arrays comprises means for transferring elements read from an array of structures associated with a host processor to a structure of arrays associated with a graphics processor. In one embodiment, further comprising means for shifting the data elements transferred to the structure of arrays to align elements of common structures into common banks.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   computing a highest common factor between a structure size of structures in an array of structures and a number of banks in a first memory device, wherein the highest common factor is different than the structure size;
   computing a shift value equal to the number of banks divided by the highest common factor;
   transferring in one transfer operation to a structure of arrays in a second memory device, a total number of elements equal to the highest common factor times the shift value, with a highest common factor number of elements from a shift value number of structures in the array of structures, wherein the second memory device having an equal number of banks as the first memory device;
   continuing the transferring in subsequent transfer operations until all elements of the array of structures are transferred to the structure of arrays; and
   shifting the data elements transferred to the structure of arrays to align elements of common structures into common banks.

2. The method of claim 1, wherein the first memory device and the second memory device are different portions of a single, shared memory device.

3. The method of claim 1, wherein transferring the elements to the structure of arrays further comprises:
   computing a modulo operation of a divisor equal to the number of banks to determine a location in the structure of arrays to which to transfer the elements.

4. The method of claim 1, wherein transferring the elements to the structure of arrays further comprises:
   executing a single instruction, multiple data (SIMD) operation to transfer the elements.

5. The method of claim 1, wherein transferring the elements to the structure of arrays comprises transferring elements from an array of structures associated with a host processor to a structure of arrays associated with a graphics processor.

6. An apparatus, comprising:
a first memory device having a number of banks to store data elements in an array of structures format;
a second memory device having the number of banks to store data elements in a structure of arrays format; and
a controller device to transfer the data elements from the first memory device to the second memory device, including the controller device being configured to
compute a highest common factor between a structure size of structures in the array of structures and the number of banks in the first memory device, wherein the highest common factor is different than the structure size;
compute a shift value equal to the number of banks divided by the highest common factor;
transfer in one transfer operation to the structure of arrays in the second memory device, a total number of elements equal to the highest common factor times the shift value, with a highest common factor number of elements from a shift value number of structures in the array of structures, wherein the second memory device having an equal number of banks as the first memory device;
continue the transfer in subsequent transfer operations until all elements of the array of structures are transferred to the structure of arrays; and
shift the data elements transferred to the structure of arrays to align elements of common structures into common banks.

7. The apparatus of claim 6, wherein the first memory device and the second memory device are different portions of a single, shared memory device.

8. The apparatus of claim 6, wherein the controller is to transfer the elements to the structure of arrays including computing a modulo operation of a divisor equal to the number of banks to determine a location in the structure of arrays to which to transfer the elements.

9. The apparatus of claim 6, wherein the controller is to transfer the elements to the structure of arrays including executing a single instruction, multiple data (SIMD) operation to transfer the elements read.

10. The apparatus of claim 6, wherein the controller is to transfer the elements to the structure of arrays including transferring elements read from an array of structures associated with a host processor to a structure of arrays associated with a graphics processor.

11. An electronic device comprising:
a host processor device;
a circuit coupled to the host processor device, the circuit including
a first memory device having a number of banks to store data elements in an array of structures format;
a second memory device having the number of banks to store data elements in a structure of arrays format; and
a controller device to transfer the data elements from the first memory device to the second memory device, including the controller device being configured to compute a highest common factor between a structure size of structures in the array of structures and the number of banks in the first memory device, wherein the highest common factor is different than the structure size; compute a shift value equal to the number of banks divided by the highest common factor; transfer in one transfer operation to the structure of arrays in the second memory device, a total number of elements equal to the highest common factor times the shift value, with a highest common factor number of elements from a shift value number of structures in the array of structures, wherein the second memory device having an equal number of banks as the first memory device; continue the transfer in subsequent transfer operations until all elements of the array of structures are transferred to the structure of arrays; and shift the data elements transferred to the structure of arrays to align elements of common structures into common banks; and
a digital display interface to couple to a display device to display data computed by the host processor.

12. The electronic device of claim 11, wherein the first memory device and the second memory device are different portions of a single, shared memory device.

13. The electronic device of claim 11, wherein the controller is to transfer the elements to the structure of arrays including computing a modulo operation of a divisor equal to the number of banks to determine a location in the structure of arrays to which to transfer the elements.

14. The electronic device of claim 11, wherein the controller is to transfer the elements to the structure of arrays including executing a single instruction, multiple data (SIMD) operation to transfer the elements read.

15. The electronic device of claim 11, wherein the controller is to transfer the elements to the structure of arrays including transferring elements read from an array of structures associated with a host processor to a structure of arrays associated with a graphics processor.

* * * * *